(12) United States Patent
Varns

(10) Patent No.: US 11,682,006 B2
(45) Date of Patent: Jun. 20, 2023

(54) MULTI-USE DIGITAL FINANCIAL CARD FOR NETWORKED TRANSACTIONS

(71) Applicant: Digipay, LLC, Lubbock, TX (US)

(72) Inventor: Lon Varns, Boerne, TX (US)

(73) Assignee: Digipay, LLC, Lubbock, TX (US)

( * ) Notice: Subject to any disclaimer, the term of this patent is extended or adjusted under 35 U.S.C. 154(b) by 155 days.

(21) Appl. No.: 17/105,391

(22) Filed: Nov. 25, 2020

(65) Prior Publication Data

US 2021/0158343 A1  May 27, 2021

Related U.S. Application Data

(60) Provisional application No. 62/940,118, filed on Nov. 25, 2019.

(51) Int. Cl.
| | |
|---|---|
| *G06Q 20/38* | (2012.01) |
| *G06Q 20/40* | (2012.01) |
| *G06Q 20/42* | (2012.01) |
| *G06Q 20/20* | (2012.01) |

(52) U.S. Cl.
CPC ....... *G06Q 20/3823* (2013.01); *G06Q 20/206* (2013.01); *G06Q 20/405* (2013.01); *G06Q 20/425* (2013.01)

(58) Field of Classification Search
USPC .......................................................... 705/71
See application file for complete search history.

(56) References Cited

U.S. PATENT DOCUMENTS

| | | | | |
|---|---|---|---|---|
| 7,472,829 | B2* | 1/2009 | Brown | G06Q 20/40 |
| | | | | 235/494 |
| 9,256,870 | B1* | 2/2016 | Howe | G06Q 40/02 |
| 2007/0208671 | A1* | 9/2007 | Brown | G06Q 20/341 |
| | | | | 705/65 |
| 2008/0000965 | A1* | 1/2008 | Zellner | G06F 16/951 |
| | | | | 235/380 |
| 2011/0153496 | A1* | 6/2011 | Royyuru | G06Q 20/385 |
| | | | | 709/204 |
| 2016/0140558 | A1* | 5/2016 | Groarke | G06Q 20/405 |
| | | | | 705/44 |
| 2019/0156335 | A1* | 5/2019 | Safak | G06Q 20/385 |
| 2020/0356982 | A1* | 11/2020 | Rutherford | G06Q 20/341 |
| 2021/0103917 | A1* | 4/2021 | Mullen | G06Q 20/204 |

FOREIGN PATENT DOCUMENTS

| | | | | |
|---|---|---|---|---|
| WO | WO-2013121053 | A1 * | 8/2013 | G06Q 20/341 |
| WO | WO-2018112526 | A1 * | 6/2018 | G06F 21/00 |

* cited by examiner

*Primary Examiner* — Christopher Bridges
*Assistant Examiner* — Timothy T. Hsieh

(57) ABSTRACT

A method of protecting transactions in a card processing system from fraud comprises issuing a payment card having a first PAN number, a second PAN number and at least one of a magnetic strip or a smart chip. The first PAN number is encoded in machine readable language on each of the at least one of the magnetic strip or the smart chip and not displayed in human readable form on the payment card. The second PAN number is displayed in human readable form on the payment card and is not encoded in machine readable language on either of the at least one of the magnetic strip or the smart chip. The first PAN number is valid in the card processing system only for card-must-be-present transactions and the second PAN number is valid in the card processing system only for card-not-present transactions.

12 Claims, 18 Drawing Sheets

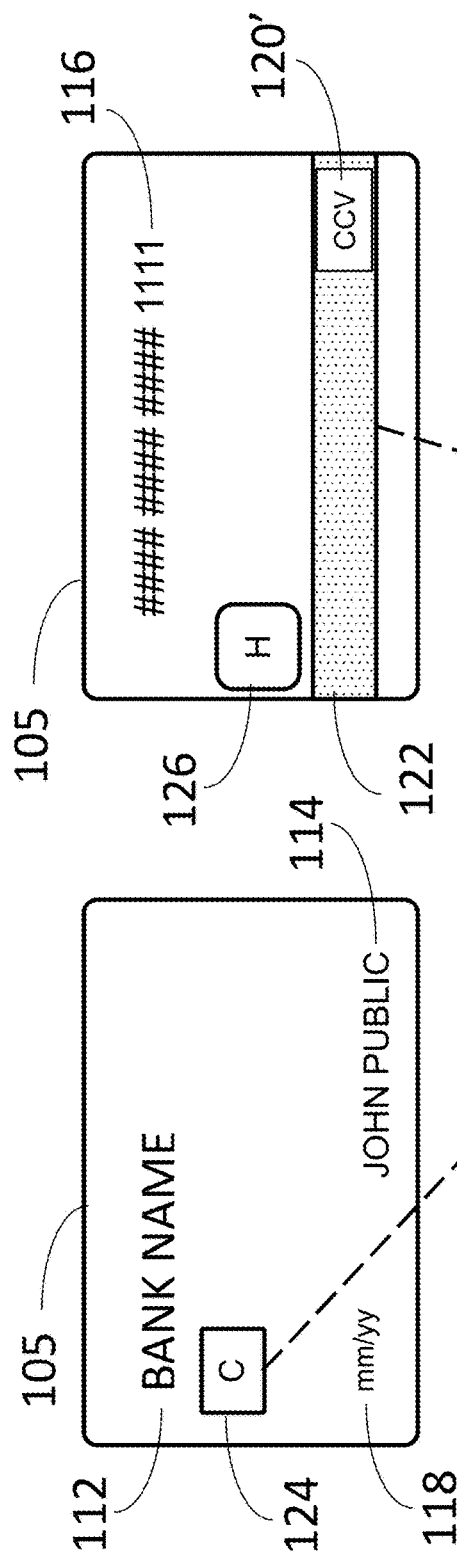
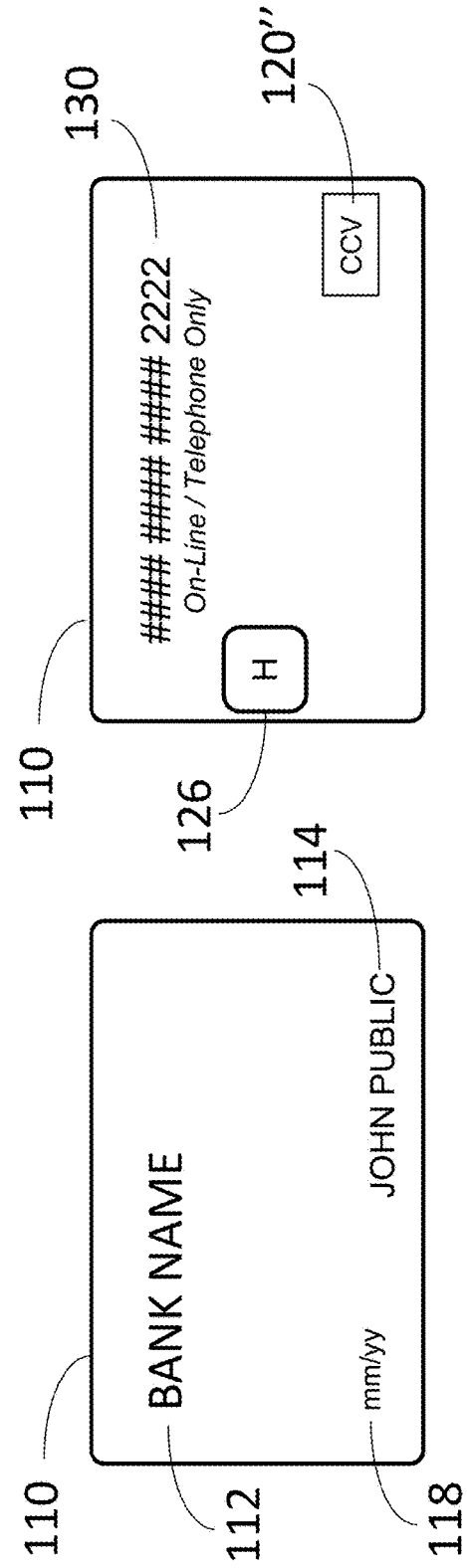
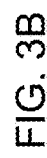
FIG. 2A
FIG. 2B
FIG. 3A
FIG. 3B

Account Summary

Welcome, John Public
Your last login was Mon, 10/30/2017 at 09:31 AM Central Time (CT)

712'

Checking, Savings and Money Market

| Account | Account Type | Available Balance | Posted Balance |
|---|---|---|---|
| Acct 1 | Savings | $100.00 | $100.00 |
| Acct 2 | Checking | $5,000.00 | $5,000.00 |

712''

Certificate of Deposit and Retirement

Open Certificate of Deposit

Credit Card, Line of Credit

Great rates, rewards, and peace of mind are just the beginning. Learn more.

FIG. 6A

Account Details

Account: [Acct 2 ▼]　　　　　　　　　　　　　　　　　　　Download Print

720

Acct 2 *7122

Available Balance　　　　　　　　　　　　　　　　　　　Posted Balance
$5,000.00　　　　　　　　　　　　　　　　　　　　　　$5,000.00

Account Number: **\*7122 Show　　Routing Number: 062000000**

Interest Rate: 0.00%　　Interest YTD: $0.00　　Previous Year's Interest: $0.00

Physical Card: **\*4087　　Digital Card: Add Card　　Manage Card**

The Digital Card is a safe and secure way to make online/telephone purchases while preserving your Physical Card number for transactions requiring a card to be present.

722　　724

Monthly Statements Acct 1 *7122

[Select Statement ▼] [Download PDF]

Posted Transactions

[View All Transactions ▼]　　　　　　　　　　　　　　[Search...]

| Date | Description | Amount | Balance |
|---|---|---|---|
| 11/02/2017 | ATM DEPOSIT | $200.00 | $5,000.00 |

FIG. 6B

Add Digital Card — 730

Add Digital Card

The Digital Card is a safe and secure way to make online/telephone purchases while preserving your Physical Card number for transactions requiring a card to be present.

Clicking below will generate a new card number for you to use when shopping or making purchases online or over the phone. This card will link to your normal account and you will see all the transactions just like normal.

You can save the card to pay your power bill, and other online payments as well and enjoy extended protection of your hard earned assets.

[ Add Digital Card and protect my Physical Card ] — 732

Disclaimer: Adding a digital card will restrict your Physical Card to Card Present transactions, like those at the grocery store. Your Digital Card will only allow card not present transactions such as those online, by mail, or by telephone.

Account Summary

Welcome, John Public
Your last login was Mon, 10/30/2017 at 09:31 AM Central Time (CT)

DigiPay Accounts

| Account | Account Type | Card Ending | Recent Transactions |
|---|---|---|---|
| Capital One MasterCard | MasterCard | ****4087 | No Recent Transactions |
| Bank Debit Card | Visa | ****1234 | MR BURCH - $14.61 |

752

DigiPay Rewards

Check Reward Balance

Load a New Card

Great rates, rewards, and peace of mind are just the beginning. Add a New Card.

Account Details

Account: Acct 2 ▼                                                    Download Print

**Acct 2 *7122**

| Available Balance | Posted Balance |
|---|---|
| $5,000.00 | $5,000.00 |

Account Number: *7122 Show    Routing Number: 062000000

Interest Rate: 0.00%      Interest YTD: $0.00    Previous Year's Interest: $0.00

Physical Card: *4087         Digital Card: *1234        Manage Cards

The Digital Card is a safe and secure way to make online/telephone purchases while preserving your Physical Card number for transactions requiring a card to be present.

**Monthly Statements Acct 1 *7122**

Select Statement ▼   [Download PDF]

Posted Transactions

View All Transactions ▼                                              Search ...

| Date | Description | Amount | Balance |
|---|---|---|---|
| 11/02/2017 | ATM DEPOSIT | $200.00 | $5,000.00 |
| 10/31/2017 | DEBIT FOR CHECKCARD XXXXXX4087 10/27/17 WALMART | ($60.00) | $4,800.00 |
| 10/31/2017 | ONLINE BANKING TRANSFER TO ACCT *8459 | ($100.00) | $4,860.00 |

FIG. 6F

MULTI-USE DIGITAL FINANCIAL CARD FOR NETWORKED TRANSACTIONS

CROSS-REFERENCE TO RELATED APPLICATIONS

This application claims benefit of U.S. Provisional No. 62/940,118, filed on Nov. 25, 2019, entitled MULTI-USE DIGITAL FINANCIAL CARD FOR NETWORKED TRANSACTIONS, the specification of which is incorporated by reference herein in its entirety.

TECHNICAL FIELD

The present invention relates in general to online financial transactions and in particular to a multi-use digital financial card for networked transactions.

BACKGROUND

A summary of credit card fraud and its economic impact is set out below. Up until now, the debit and credit card fraud protection industry has relied largely on algorithmic programs and analyses designed to attempt to identify prospective fraudulent transactions before approval and funding based upon a particular card user's habits and patterns. Additionally, there are single use digital mediums in the market. Other such attempts to limit or eliminate card fraud include PIN numbers, CCV numbers, and electronic credit monitoring tools, websites and programs, passwords and the like.

Payment Card fraud is the most common form of identity theft and has been increasing each year. It accounts for more than $20 Billion worldwide annually. Confidential account details are easily stolen because the information is stored in the track data of the card's magnetic stripe. Even EMV chip cards still have a magnetic stripe with account details. Stolen EMV card data can still be used to commit identity theft in three ways: 1) At a non-EMV equipped POS terminal; 2) Online/keyed/telephone purchase (CNP); and 3) Fallback—at a chip terminal that "errors out" and falls back to the magnetic stripe.

There are two primary categories of card fraud: Counterfeit and CNP. Counterfeit cards can be created when card/account information that is stored on the original card's magnetic stripe is obtained through skimming devices or when certain types of malicious malware are installed (either at the POS terminal or inside the merchant or processor's ERP system). The stolen account details are then sold on the dark web and fraudsters will produce counterfeit cards. Because the account number, expiration date, security code details are exactly the same on the cloned card as the compromised card, the counterfeit card can be used immediately without the cardholder knowing their account is at risk. CNP, i.e., "Card Not Present" transactions occur when a counterfeit card is used to buy items online or over the phone.

Payment card fraud impacts both card issuers and cardholders. For example, with respect to issuers, Visa/MasterCard operating rules require issuers to extend "zero liability" to cardholders for fraud (i.e., absorb all fraud losses). Issuer must file insurance claims, close compromised cards, produce and ship replacement cards, log all disputed transactions for regulatory compliance and submit dispute paperwork to card processor/associations. Banks/Credit Unions must abide by applicable consumer protection laws, e.g., Reg. E(debit) and Reg. Z (credit). With respect to cardholders, when card fraud occurs, cardholders must complete dispute paperwork, destroy compromised cards and await replacement cards to be produced and shipped. Issuers have 5-10 business days to process and issue provisional credit and final credit can take up to an additional 45-60 days. Once they receive their replacement card, the cardholder must change the card information on file for all recurring payments (e.g., Amazon, Netflix, online bill pay, etc.) with the new card details.

Issuer's responses to counterfeit card fraud include EMV Chips and Tokenization. EMV is short for Europay, MasterCard, and Visa, the 1994 founders of the EMV standard. EMV commonly refers to a credit card with a smart chip. The EMV chip cannot be cloned and encrypts the transaction making any information obtained unusable to fraudsters. If stolen account details from the magnetic stripe of a EMV chip card are used to create a counterfeit card, the cloned card cannot be used at a chip terminal. Furthermore, any losses with that cloned card at a non EMV equipped POS terminal are shifted to the merchant. CNP losses on the cloned card are still the issuer's responsibility to absorb. With Tokenization, e.g., as used with Apple Pay/Android Pay/Samsung Pay, payment card details are securely stored within a mobile device with either a biometric or account password. A unique token number is assigned to the card for that mobile device. When the mobile device is used at a POS terminal, the transaction details are encrypted and only the token number for the card is used. If transaction details are compromised, no account information can be gained by hackers and the token cannot be counterfeit.

Issuer's responses to CNP fraud have not yet been sufficiently addressed. Card-not-present ("CNP" for short) fraud occurs in fraudulent transactions where a cardholder does not present a card to a merchant in person. It includes internet, phone and mail-order transactions. As a result of EMV issuance, there has been a significant shift to CNP fraud, e.g., online, mail-order, keyed (i.e., manually input account numbers) and telephone-order, and to non EMV equipped terminals. Most issuers continue to rely solely on network defined authorization risk scoring models (e.g., Falcon/Prism) to score transactions, or they may have advanced behavioral analytics software that compares transaction flow to historical cardholder usage patterns (typically very expensive to purchase and manage, and not very effective at stopping CNP fraud).

In some settings, CNP fraud can be effectively mitigated. In the Commercial Card environment, companies are generating one-time use virtual cards for their accounts payables with specific spend controls (exact pay, short expiration dates, MCC/SIC code restrictions, date/time restrictions, velocity restrictions, etc.). This can be very effective at all types of fraud prevention including CNP. The problem is this procedure is very expensive and impractical for retail banking applications. In an example for illustration purposes: Assume ACME Corporation has an invoice for $17,512.53 payable to FedEx due on Oct. 15, 2017. The company's ERP system will generate a weekly/monthly payment file that is sent to a 3rd party AP system (e.g., SunGard). All invoices that can be paid with a card will have a one-time use card generated good only for the exact amount, active only on the date the invoice is due, and restricted to that vendor's MCC or SIC code.

The challenge becomes how to apply technology that is used in the commercial banking environment to retail customers. Customers are not likely to agree to the same level of stringent controls as are in place for commercial cards each time they want to make an online purchase. Thus, any solution for the consumer environment must be easy and inexpensive for both the issuers and cardholder in order to achieve mass adoption. Any solution must also address the primary risks to be mitigated, i.e., for issuers—how to decrease CNP fraud losses; and for the cardholder—how to decrease the time/costs associated with identity theft and/or to reduce account losses.

The following chart shows: Card Fraud Worldwide in terms of Global Losses in $ Bil. 2010-2020 and in terms of Cents per $100 of Total Volume:

| Year | Global Losses US$ (billions) | Cents per $100 of total volume |
| --- | --- | --- |
| 2010 | 7.60 | 4.5 |
| 2011 | 9.84 | 5.1 |
| 2012 | 11.27 | 5.2 |
| 2013 | 13.70 | 5.5 |
| 2014 | 18.11 | 6.2 |
| 2015 | 21.84 | 7.0 |
| 2016 | 24.71 | 7.2 |
| 2017 | 27.69 | 7.2 |
| 2018 | 31.26 | 7.3 |
| 2019 | 32.82 | 6.9 |
| 2020 | 31.67 | 6.5 |

Worldwide fraud losses: $21.84 billion. U.S. portion of worldwide losses: 38.7%. Projected worldwide losses in 2020: $31.67 Billion.

Card Fraud Statistics: Card issuer losses occur mainly from counterfeit credit/debit cards used at the point of sale and ATMs. Counterfeit fraud worldwide has been increasing by double digits and is led primarily by US and Canada. Issuers absorb 72% of fraud losses worldwide. Fraud losses to merchants occur primarily from CNP transactions & account for 41.2% of all fraud in US.

SUMMARY

The principles of the present invention are preferably embodied in a process under which a digital multi-use debit and/or credit card or other related payment medium number is generated by one or more digital buttons embedded in a user's bank or other type of financial account, which effectively bifurcates the card for the account into a multi-use digital card/eCommerce card and a multi-use physical card.

Advantageously, the principles of the present invention allow for use of a digital financial card (with a unique number) for online transactions and a physical card (with a different unique number) for in person transactions all within the same account.

In one aspect, a method of protecting transactions in a card processing system from fraud comprises issuing a first physical card having a first account number and a at least one of a magnetic strip and a smart chip. The first physical card is valid only for card-must-be-present transactions. The method further comprises issuing a second physical card having a second account number, the second physical card without either a magnetic strip or chip. The second physical card is valid only for card-not-present transactions.

In one embodiment, the first account number is a first permanent account number (PAN) number and the second account number is a second PAN number.

In another embodiment, the first PAN number is selected from a first preselected bank identification number (BIN) number range and the second PAN number is selected from a second preselected BIN number range.

In another aspect, a method of protecting transactions in a card processing system from fraud comprises issuing a payment card having a first account number, a second account number and at least one of a magnetic strip or a smart chip. The first account number is encoded in machine readable language on each of the at least one of the magnetic strip or the smart chip and not displayed in human readable form on the payment card. The second account number is displayed in human readable form on the payment card and is not encoded in machine readable language on either of the at least one of the magnetic strip or the smart chip. Only the first account number is valid in a card processing system only for card-must-be-present transactions. Only the second account number is valid in a card processing system only for card-not-present transactions.

In one embodiment, the first account number is a first PAN number and the second account number is a second PAN number.

In another embodiment, the first PAN number is selected from a first preselected BIN number range and the second PAN number is selected from a second preselected BIN number range.

In still another aspect, an enhanced-security payment card comprises a physical card having a body, and at least one of a magnetic strip or a smart chip. A first account number issued for a card processing system is encoded in machine readable language on each of the at least one of the magnetic strip or the smart chip and not displayed in human readable form on the card body. A second account number issued for the card processing system is displayed in human readable form on the card body and is not encoded in machine readable language on either of the at least one of the magnetic strip or the smart chip. Only the first account number is valid only for card-must-be-present transactions on the card processing system. Only the second account number is valid for card-not-present transactions on the card processing system.

In one embodiment, the first account number is a first PAN number and the second account number is a second PAN number.

In another embodiment, the first PAN number is selected from a first preselected BIN number range and the second PAN number is selected from a second preselected BIN number range.

In still another embodiment, the enhanced-security payment card further comprises a return code comprising four digits printed in human readable form on the card body. The return code is identical to the last four digits of the first account number.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A and 2B are, respectively, front and back views of the CPO payment card of FIG. 1 in accordance with one embodiment;

FIGS. 3A and 3B are, respectively, front and back views of the CNP/eCommece payment card of FIG. 1 in accordance with another embodiment;

FIGS. 6A-6G illustrate graphical user interface (GUI) screens suitable for implementing the payment system of FIGS. 5A-5H.

DETAILED DESCRIPTION

Figure 1:
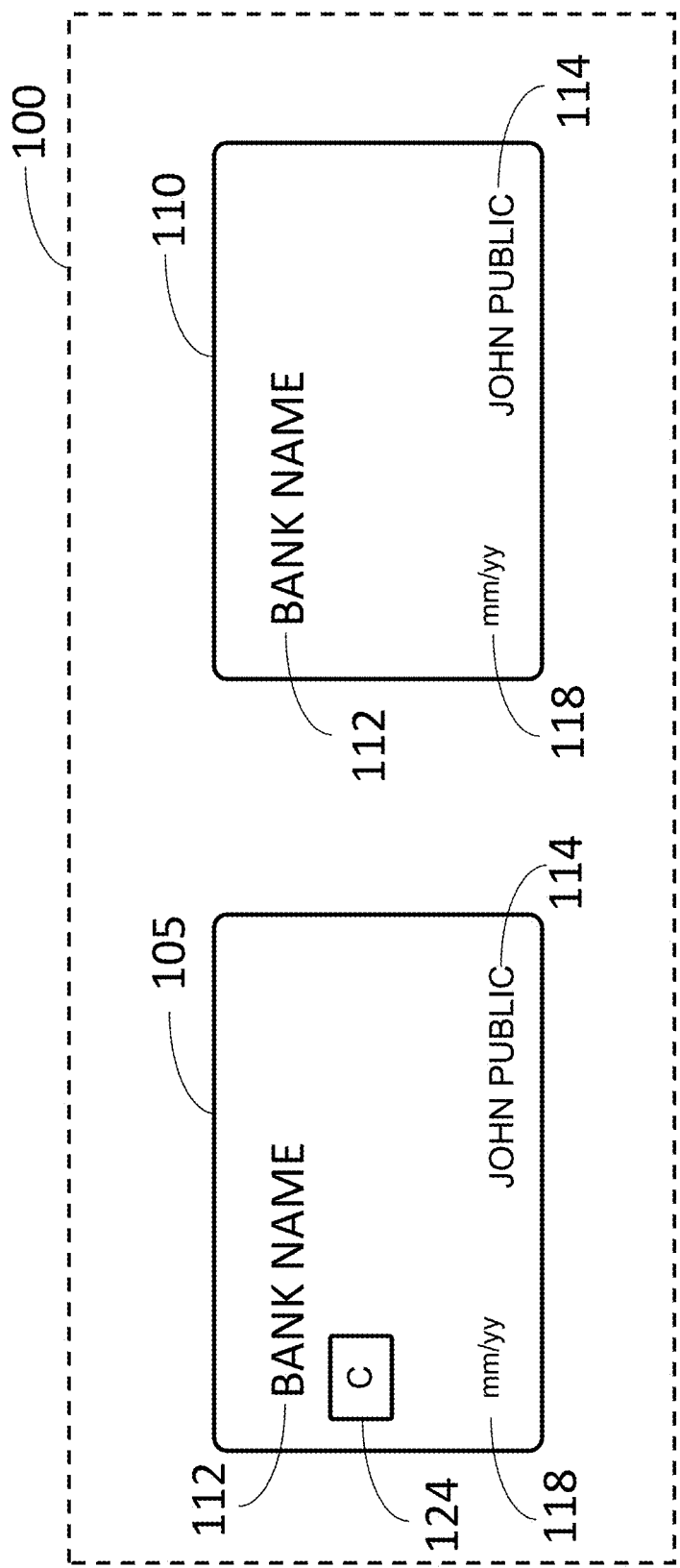
FIG. 1 is a set of payment cards comprising a payment system in accordance with one aspect.

The principles of the present invention and their advantages are best understood by referring to the illustrated embodiment depicted in the drawings, in which like numbers designate like parts.

With the advent of microchip ("EMV") protected credit and debit cards, credit and debit card fraud has shifted significantly away from point of sale/transaction (merchant terminal) fraud to card not present fraud (online, keyed or over the telephone). Card not present fraud bypasses the safety features afforded by the EMV chip. In card not present fraud transactions, fraudsters steal card numbers or utilize existing stolen card numbers obtained from nefarious sources, or create counterfeit cards, to purchase goods and steal money, other financial instruments and property from consumers online, keyed and over the telephone where physical inspection, EMV card insertion or card swiping is not required to completely consummate a transaction.

Embodiments of the present invention substantially diminish the ability of fraudsters and thieves to perpetrate card not present based fraud transactions by use of a unique digital fraud protection process. In the systems and processes described herein, a multi-use digital debit and/or credit card or other related payment medium is generated through an online banking or mobile website by use of a digital button or other electronic means (it being understood that the online banking or mobile system initiates the generation of the multi-use cards, whereas the actual payment cards may be generated elsewhere, e.g., in the core banking system). The digital button or other electronic means is specifically designed and tailored to each of the many banking core systems utilized by financial, bank, credit union institutions and the like. Once created, the consumer's new multi-use digital debit and/or credit card or other related payment medium stands alongside his or her already existent physical card for his/her particular account.

In particular, the new, multi-use digital or eCommerce debit and/or credit card or other related payment medium that is created contains its own unique number, but is linked directly to the consumer's account. The new, multi-use digital (or eCommerce) debit and/or credit card or other related payment medium is available for online, keyed and over the telephone transactions only. All point of sale/transaction (merchant terminal) transactions are disabled for the digitally created debit and/or credit or other related payment medium. In addition, the digital card/eCommerce card supports the setting of categorical spend controls for the online, keyed and over the telephone transactions accessed via personalized toggle switches within the online banking page. Furthermore, the digital card/eCommerce card also supports the setting of per transaction, per merchant, daily spending limits, and the like.

Advantageously, the principles of the present invention, which are based on a multi-use digital or eCommerce debit and/or credit card or other related payment medium, minimize or eliminate card fraud generated with counterfeit card numbers utilized in "card not present transactions," while restricting the physical card to "card present payments" where traditional security measures can be utilized.

Referring now to FIG. 1, there is illustrated a payment card system 100 in accordance with one aspect. The payment card system 100 includes a CPO payment card 105 and a CNP/eCommece payment card 110, both linked to the same user account in a card processing system as further described herein. Unless otherwise indicated, the term "CPO" means "Card Present Only" and the term "CNP" means "Card Not Present." The CPO payment card 105 can be used to authorize account transactions in the card issuer's processing system by using a POS/merchant terminal equipped with a smart chip reader and/or a magnetic strip reader, but it cannot be used to authorize account transactions online, by keying or by telephone (i.e., verbally) by providing the first human-readable account number printed on the CPO card. The CNP/eCommece payment card 110 can be used to authorize account transactions online, by keying or by telephone by providing a second human-readable account number printed on the CNP/eCommece card, but it cannot be used to authorize account transactions at a POS terminal equipped with a smart chip reader and/or a magnetic strip reader. In some embodiments, the CNP/eCommece payment card 110 can also be used to authorize mobile wallet transactions using a tokenized identification number produced from the second human-readable account number printed on the CNP/eCommece card and entered into a mobile wallet application by the user or by taking a photo of the human-readable account number and entering the human-readable number into a program using Optical Character Recognition (OCR).

Referring now also to FIGS. 2A and 2B, the CPO payment card 105 can resemble a conventional payment card, e.g., credit card or debit card, including an issuer name 112, cardholder name 114, first human-readable account number 116, expiration date 118 and "CCV" or security code 120. The CPO payment card 105 further includes at least one of, and preferably both, a magnetic strip 122 and a smart chip 124 (e.g., EMV chip). The CPO payment card 105 may further include a security hologram 126. The magnetic strip 122 and the smart chip 124 each include an encoded machine-readable account number 128 that cannot be read by a human. In the CPO payment card 105, the first human-readable account number 116 and the machine-readable account number 128 number are the same first account number. The first account number 116, 128 is marked in the card processing system as authorized for use in "Card is Present" situations, e.g., when the CPO card 105 is present at the POS/merchant terminal. Thus, when used to authorize transactions at a POS terminal using a chip reader or card strip reader, the CPO payment card 105 will work like a conventional payment card. However, the first account number 116, 128 of the CPO card 105 is flagged in the card processing system as not authorized for use when the card 105 is not present, i.e., not authorized for "Card Not Present" transactions. Thus, any CNP transactions attempted online, by keying or by telephone using the account number on the CPO card 105 will not be authorized (i.e., will be declined). If the CPO payment card 105 is read by an unauthorized person using a card skimmer or malware to extract the first account number 116, 128, the unauthorized person will not be able to use the extracted account number to make purchases online, by keying or by telephone due to the flag declining CNP transactions in the associated card processing system. Thus, the system 100 helps reduce card fraud due to skimmed card numbers Referring now also to FIGS. 3A and 3B, the CNP/eCommece payment card 110 of the system 100 can include some of the features found on the CPO card 105, such as issuer name 112, cardholder name 114, expiration date 118, CCV or security code 120 and optionally, the hologram 126. The CNP/eCommece payment card 110 need not include the magnetic strip 122 or smart chip 124. In some embodiments, the CNP/eCommece payment card 110 can be a virtual card, i.e., a digital only-card such as an image of a card displayed on a terminal or mobile device. In other embodiments, the CNP/eCommece payment card 110 is a physical card issued by the issuer such as a plastic or paper card. In some embodiments, the CNP/eCommece card 110 is substantially less expensive than the CPO card 105 since no smart chip 124 or magnetic strip 122 is used. The CNP/eCommece payment card 110 further includes a human-readable second account number 130 that is different from the first human-readable number 116 and the machine-readable account number 128 of the CPO payment card 105. The second account number 130 is marked in the card processing system as authorized for use in "Card Not Present" situations such as online, keyed and telephone purchases, but flagged as not authorized for use in "Card is Present" situations. Thus, the CNP/eCommece payment card 110 will not work at a POS terminal using a chip reader or card strip reader, rather, the user will need to use the CPO payment card 105. Since the user knows the CNP/eCommece payment card 110 cannot be used at POS/merchant terminals, the CNP/eCommece payment card and its second account number 130 will not be exposed to possible theft from card skimmers or malware used with POS terminal systems. The CNP/eCommece payment card 110 will work like a conventional payment card when used online, by keying or on the telephone. If allowed by the payment processor, the second human-readable account number 130 printed on CNP/eCommece payment card 110 can also be used to authorize mobile wallet transactions using a tokenized identification number produced from the second human-readable account number.

In some embodiments, the account number for the physical/CPO payment card 105 can be a first PAN number, and in some further embodiments, the first PAN number can be selected from a first preselected range of BIN numbers corresponding to physical/CPO payment cards. In some embodiments, the account number for the CNP/eCommece payment card 110 can be a second PAN number, and in some further embodiments, the second PAN number can be selected from a second preselected range of BIN numbers corresponding to CNP/eCommerce payment cards.

Figures 4A, 4B:
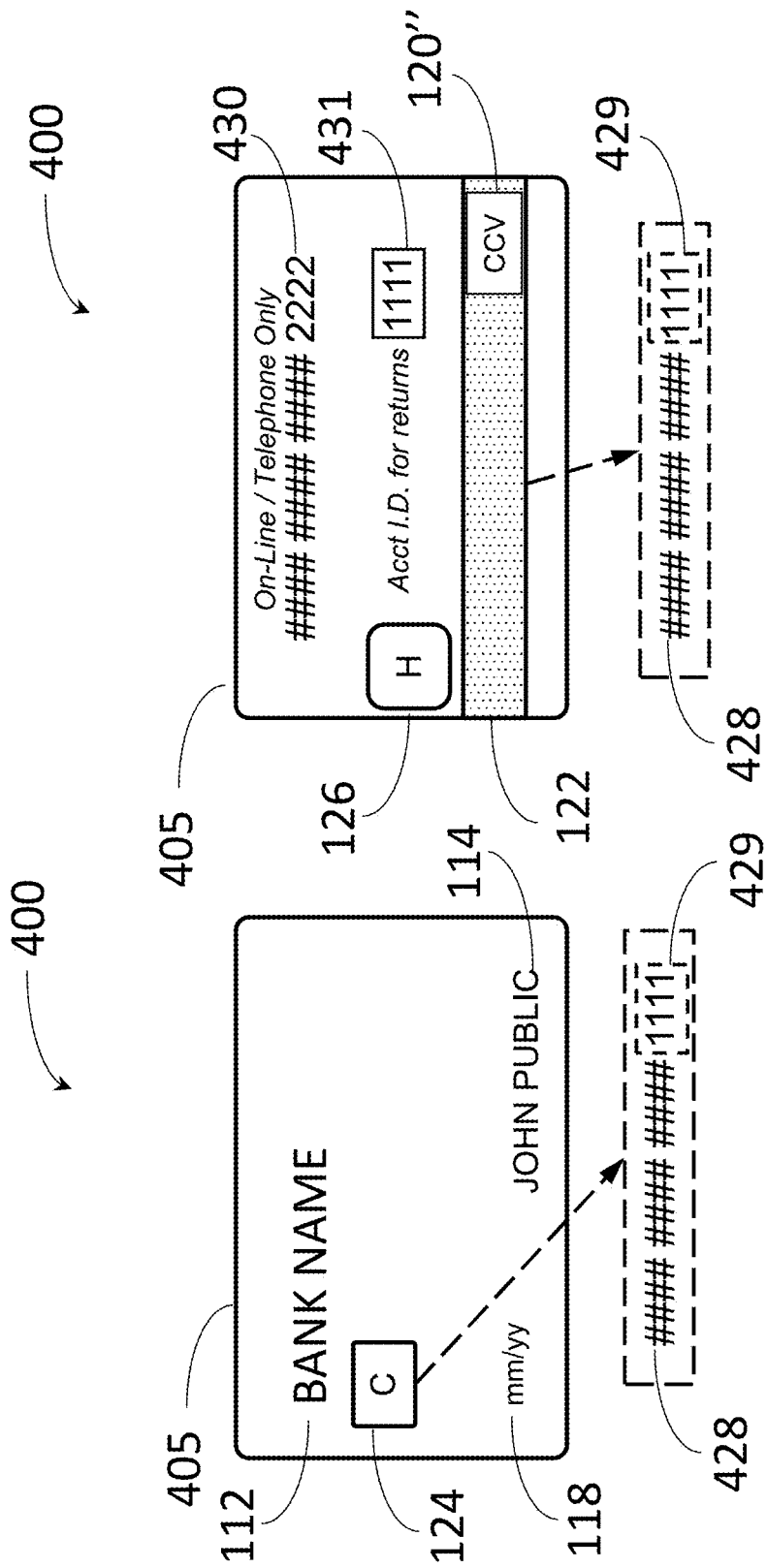
FIGS. 4A and 4B are, respectively, front and back views of a hybrid payment card in accordance with another aspect.

Referring now to FIGS. 4A and 4B, there is illustrated a payment card system 400 in accordance with another aspect. The payment card system 400 includes a hybrid payment card 405 that includes two account numbers, namely, a first account number that is machine readable, and a second account number that is human readable. Both the first and second account numbers are linked to the same user account in a card processing system as further described herein. In some embodiments, the first and second account numbers will be PAN numbers. The hybrid payment card 405 can be used authorize account transactions in the card issuer's processing system with the machine readable first account number by using a POS terminal equipped with a smart chip reader and/or a magnetic strip reader, and it can also be used to authorize account transactions online, by keying or by telephone by providing the human-readable second account number printed on the hybrid payment card. In some embodiments, the hybrid payment card 405 can also be used to authorize mobile wallet transactions using a tokenized identification number produced from the human-readable second account number printed on the card.

The hybrid payment card 405 can resemble a conventional payment card, e.g., credit card or debit card, including elements such as issuer name 112, cardholder name 114, human-readable second account number 430, expiration date 118, hologram 126 and "CCV" or security code 120. In some embodiments, the CCV/security code 120 corresponds only to the human readable second account number. The hybrid payment card 405 further includes at least one of, and preferably both, magnetic strip 122 and smart chip 124. The magnetic strip 122 and the smart chip 124 each include an encoded machine-readable first account number 428 that is not human readable, i.e., the number is not printed on the card and cannot be read directly by a human without the aid of a technological device, e.g., electronic chip reader or strip reader.

In the system 400, the machine-readable first account number 428 is marked in the card processing system as authorized for use in "Card is Present" situations, e.g., when the hybrid card 405 is present at a POS terminal. Thus, when used to authorize transactions at a POS terminal using a chip reader or card strip reader, the machine readable first account number 428 will be read and used such that hybrid payment card 405 will work like a conventional payment card. However, the machine-readable first account number 428 of the hybrid card 405 is flagged in the card processing system as not authorized for use when the card 405 is not present, i.e., not authorized for "Card Not Present" transactions. Thus, any CNP transactions attempted online, by keying or by telephone using the machine readable account number 428 on the hybrid payment card 405 will be declined. Therefore, if the hybrid payment card 405 is read by a fraudster or other unauthorized person, e.g., using a card skimmer or malware at a POS terminal to extract the machine-readable account number 428, the extracted machine readable account number cannot be used to make purchases on line, by keying or by telephone due to the presence in the processing system of the flag declining CNP transactions using the machine readable account number. Thus, the system 400 helps reduce card fraud due to skimmed card numbers.

The human readable account number 430 on the hybrid payment card 405 is different from the machine readable number 428, but is linked to the same user account in the card processing system. The human readable account number 430 is marked in the card processing system as authorized for use in "Card Not Present" situations such as online, keyed and telephone purchases, but flagged as not authorized for use in "Card is Present" situations. The user can thus use the human readable account number 430 on the hybrid payment card 405 to make online, keyed and telephone transactions like a conventional payment card. In some embodiments, the human readable account number 430 on the hybrid payment card 405 can also be authorized in the card processing system for mobile wallet transactions using a tokenized identification number produced from the human-readable account number printed on the hybrid card. Thus, the user can use the hybrid card 405 for both "Card is Present" and "Card Not Present" situations like a conventional payment card, but with increased security against card fraud.

In the hybrid card 405, the last four digits of the machine-readable account number 428 are termed the card ID 429, since these four digits are often used to identify a card for return (i.e., credit refund) purposes. In some embodiments of the hybrid card 405, the card ID 429 is printed on the card in human readable form as a four-digit return ID 431. Thus, by using the human readable return ID 431, the machine readable first account number 428 can be identified (but not revealed) for user convenience when making returns, but without disclosing the entire machine readable first account number so as to compromise the enhanced anti-fraud features. Put another way, even when the machine readable return ID 431 is provided, the machine readable first account number 428 is not provided in human readable form.

In some embodiments, the machine readable first account number 428 for the hybrid payment card 405 can be a first PAN number, and in some further embodiments, the first PAN number can be selected from a first preselected range of BIN numbers corresponding to physical/CPO payment cards. In some embodiments, the human readable second account number for the hybrid payment card 405 can be a second PAN number, and in some further embodiments, the second PAN number can be selected from a second preselected range of BIN numbers corresponding to CNP/eCommerce type payment cards or used for online, keyed and telephone transactions.

Referring now to FIGS. 5A-5H, there are illustrated various technical processes required to implement a payment card system 500 according to further aspects. The processes of the payment card system 500 can be implemented between an online banking system/mobile banking system 510, an issuer's core banking system 520 and an issuer's card processing system 530. The system 500 leverages the technology used in commercial card banking so that issuers can provide similar fraud mitigation techniques that large corporations are currently using to the retail customer.

In one embodiment of the system 500, issuers continue to provide an EMV chip card per cardholder, but restrict that card to physical (swiped/inserted) transactions. CNP transactions are disallowed at the network level. This eliminates issuer's liability for all counterfeit losses associated with that EMV card (CNP transactions are always declined and any counterfeit loss will only occur at non-EMV terminals and the loss shifts to the merchant). In some embodiments, the EMV chip card of this system 500 can be the CPO payment card 105 previously described. All CNP transactions in the system 500 must be done with a "Digital Card" or "eCommerce Card." The Digital Card/eCommerce Card is created at account opening or through the online banking system and is only used for CNP (online/telephone) transactions. There is no magnetic stripe, so the Digital card/eCommerce card can only be compromised if an online payment system is breached). In some embodiments, the Digital card/eCommerce card of this system 500 can be the CNP/eCommece payment card 110 previously described. Advantage to the cardholder of the system 500: The digital card/eCommerce card account number is used for all recurring/online transactions, better control (spend controls), fewer fraud packets to complete, less frustration associated with having to continually update online merchants with new card details each time their physical card is compromised. Moreover, the bifurcation of the transaction stream into specific payment channels by card type allows for the card issuer's internal real-time fraud solutions to be more efficient and effective. A card issuer has a limited amount of time to decision a transaction and can only enable a handful of real-time fraud prevention rules. As such, the bank can choose to remove any real-time card-present rules and deploy only CNP real-time rules on the digital/eCommerce card and similarly, only enable card-present rules for the CPO card.

Figure 5A:
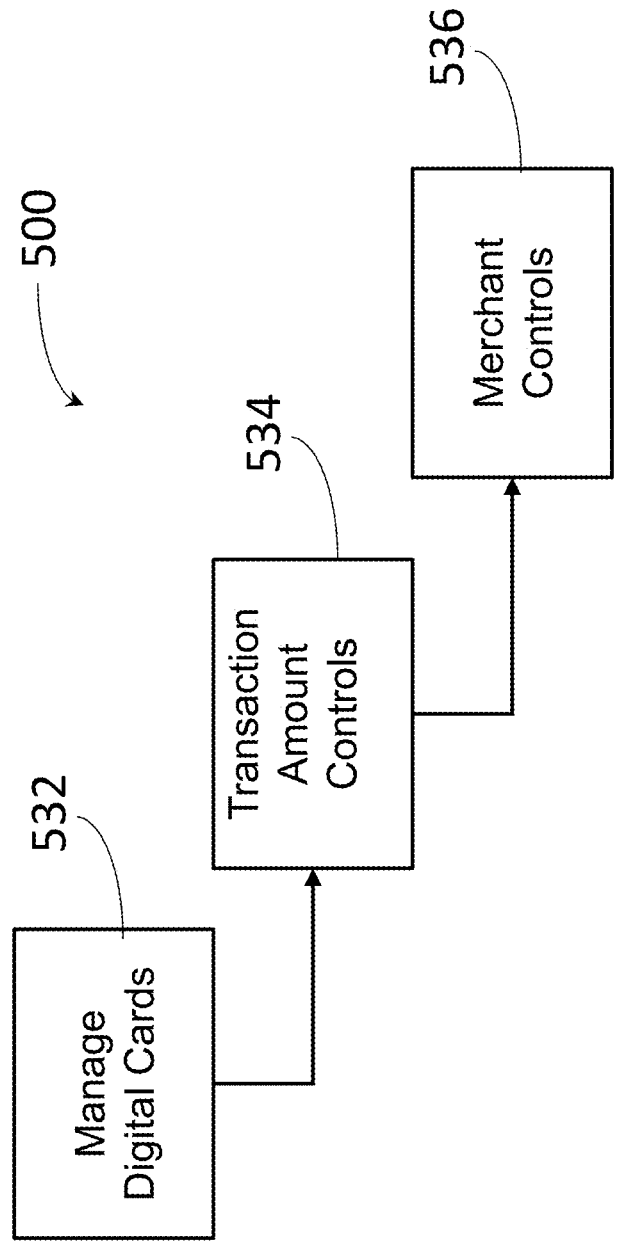
FIGS. 5A-5H are flowcharts describing operation of a payment system in accordance with further aspects.

Referring now to FIG. 5A, there is illustrated a high-level model of the processes for managing the digital card/eCommerce card aspect of the system 500. In some embodiments, the digital card/eCommerce card aspect comprises the CNP/eCommece payment card 110, and in other embodiments, it comprises the human readable (i.e., online) account number 430 of the hybrid card 405. At the first level, block 532 comprises managing the digital card/eCommerce cards. Block 534, disposed below block 532, comprises transaction amount controls. Transaction amount controls can include, but are not limited to, setting or selecting: a) number of transactions per day/month; b) dollar amounts of transactions per day/month; and c) date/time restrictions (e.g., 8:00 am-5:00 pm). Block 536, disposed below block 534, comprises merchant controls. Merchant controls can include, but are not limited to, setting or selecting: a) approved merchant categories (e.g., check box of MCC/SICs); b) U.S. merchants only/Allow International (e.g., check box of international countries allowed); and c) restricted MCCs.

Figure 5B:
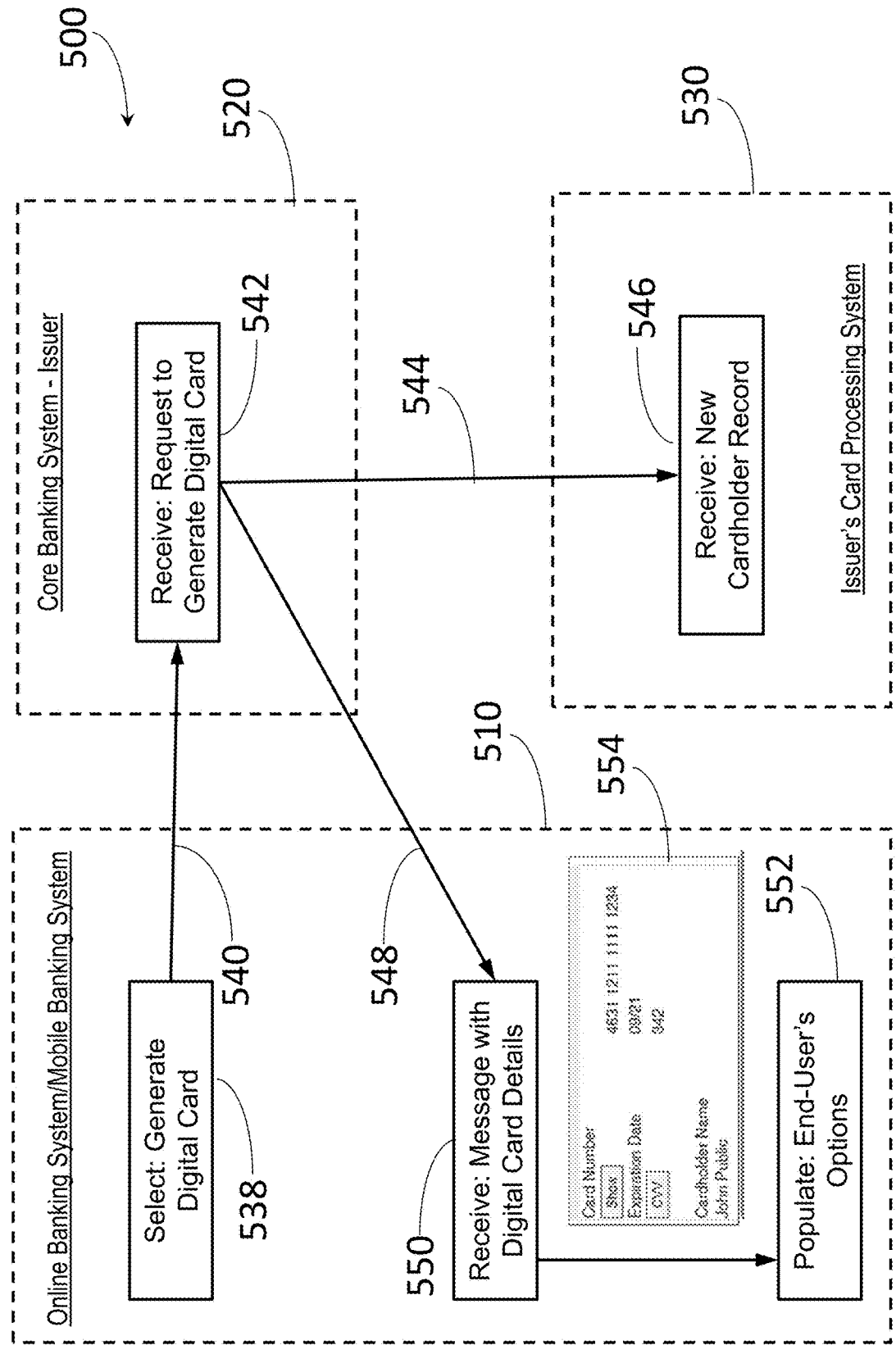

Referring now to FIG. 5B, there is illustrated an API call in the system 500 to generate a digital card/eCommerce card in accordance with one embodiment. In some embodiments, the digital card/eCommerce card can be the CNP/eCommece payment card 110. The process begins at block 538 when the user selects "Generate Digital Card" or "Add Card" in Online Banking/Mobile Application 510 (e.g., FIG. 6B). The OLB/Mobile application 510 will send a message 540 to Core Banking System 520 to Generate a Digital Card (or eCommerce Card) in the digital BIN or range. Next, at block 542, the Core Banking System 520 receives request 540 to Generate Digital Card. Core Banking System 520 generates a new PAN (Primary Account Number) in the digital BIN range, i.e., in a preselected BIN range corresponding to CNP/eCommerce cards or authorized only for CNP transactions. Core Banking System 520 sends Card Details 544 to Card Processor 530 like any other new card order request. At block 546, Card Processor 530 receives new cardholder record 544 from the Core Banking System 520 that a new digital card/eCommerce card has been created. The card details are added to the card management system for activation and authorization screening like all other new card order requests. Card Processor 530 can have a Digital BIN range enabled to only authorize CNP transactions and decline any card present (swiped/chip processed) authorizations. Also from block 542, the Core Banking System 520 sends a message 548 to the OLB/Mobile application 510. At block 550, the OLB/Mobile System 510 receives message 548 from core banking system with digital card/eCommerce card details to populate the end user's card management option section in OLB/Mobile. At block 552, the OLB/Mobile System 510 populates the digital details shown in screen image 554.

Figure 5C:
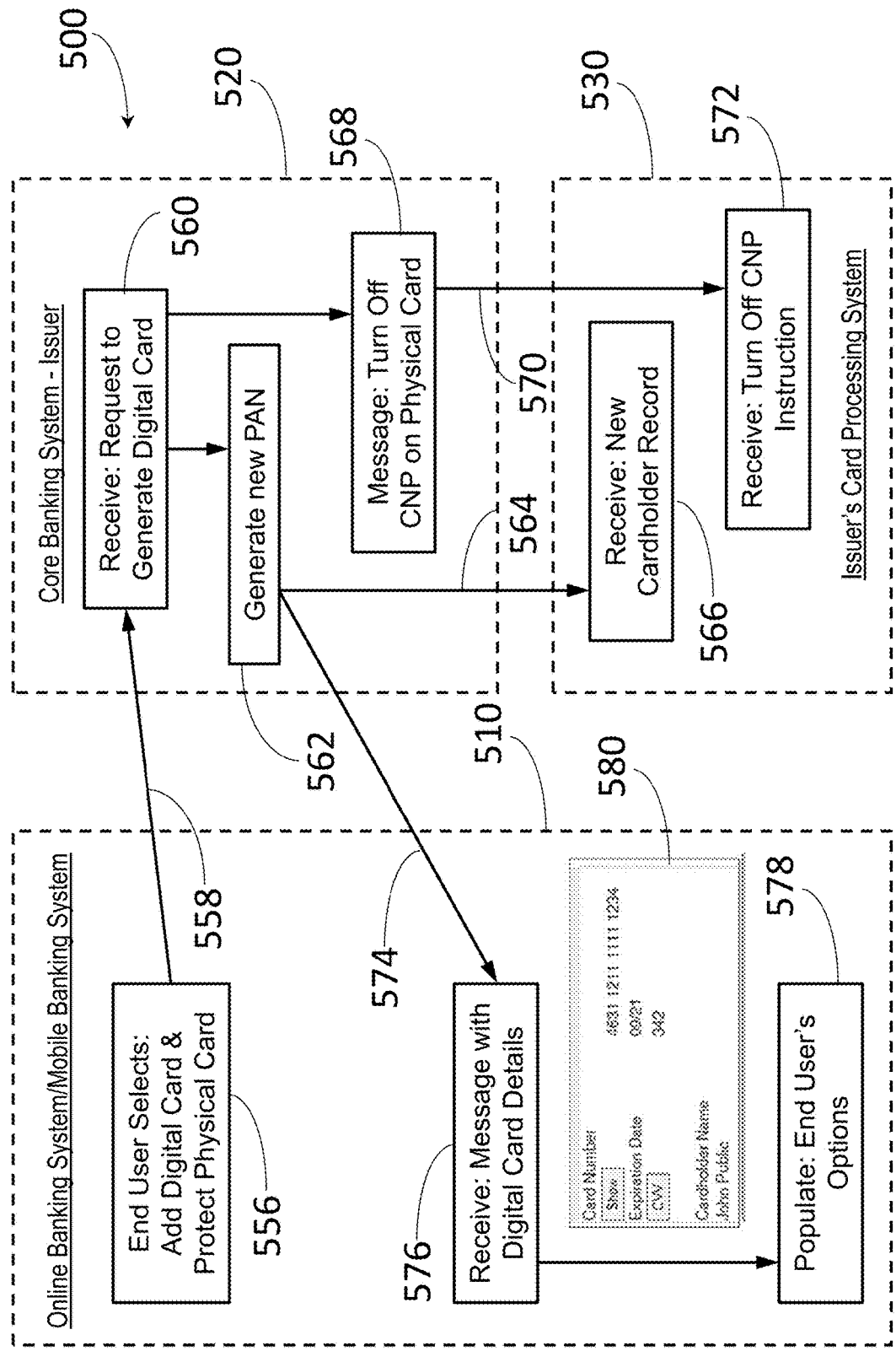

Referring now to FIG. 5C, there is illustrated an API call in the system 500 to add a Digital Card (or eCommerce Card) and protect physical card in accordance with one embodiment. In some embodiments, the digital card/eCommerce card can be the CNP/eCommece payment card 110 and the physical card can be modified into the CPO card 105 through settings in the card processing system 530. The process begins at block 556 when the end user selects "Add Digital Card & Protect Physical Card" in Online Banking/Mobile Application (e.g., FIG. 6C). The OLB/Mobile application 510 will send a message 558 to Core Banking System 520 to Generate a Digital Card (or eCommerce Card) in the Digital BIN or range & disallow CNP transactions on Physical Card. Next, at block 560, the Core Banking System 520 receives request 558 to Generate Digital Card. At block 562, the Core Banking System 520 generates a new PAN (Primary Account Number) in the digital BIN range. Core Banking System 520 sends Card Details 564 to Card Processor 530 like any other new card order request. At block 566, Card Processor 530 receives new cardholder record 564 from the Core Banking System 520 that a new digital card/eCommerce card has been created. The card details are added to the card management system for activation and authorization screening like all other new card order requests. Card Processor 530 can have a Digital BIN range enabled to only authorize CNP transactions and decline any card present (swiped/chip processed) authorizations. At block 568, the Core Banking System 520 issues a maintenance message 570 to turn off Card not Present transactions on the Physical Card. At block 572, Card Processor 530 receives maintenance message 570 from Core Banking System 520 to turn off Card not Present transactions on the Physical Card. In some embodiments, this action converts a conventional physical card into a CPO payment card 105. Also from block 562, the Core Banking System 520 sends a message 574 to the OLB/Mobile application 510. At block 576, the OLB/Mobile System 510 receives message 574 from core banking system with digital card/eCommerce card details to populate the end user's card management option section in OLB/Mobile. At block 578, the OLB/Mobile System 510 populates the digital details shown in screen image 580.

Figure 5D:
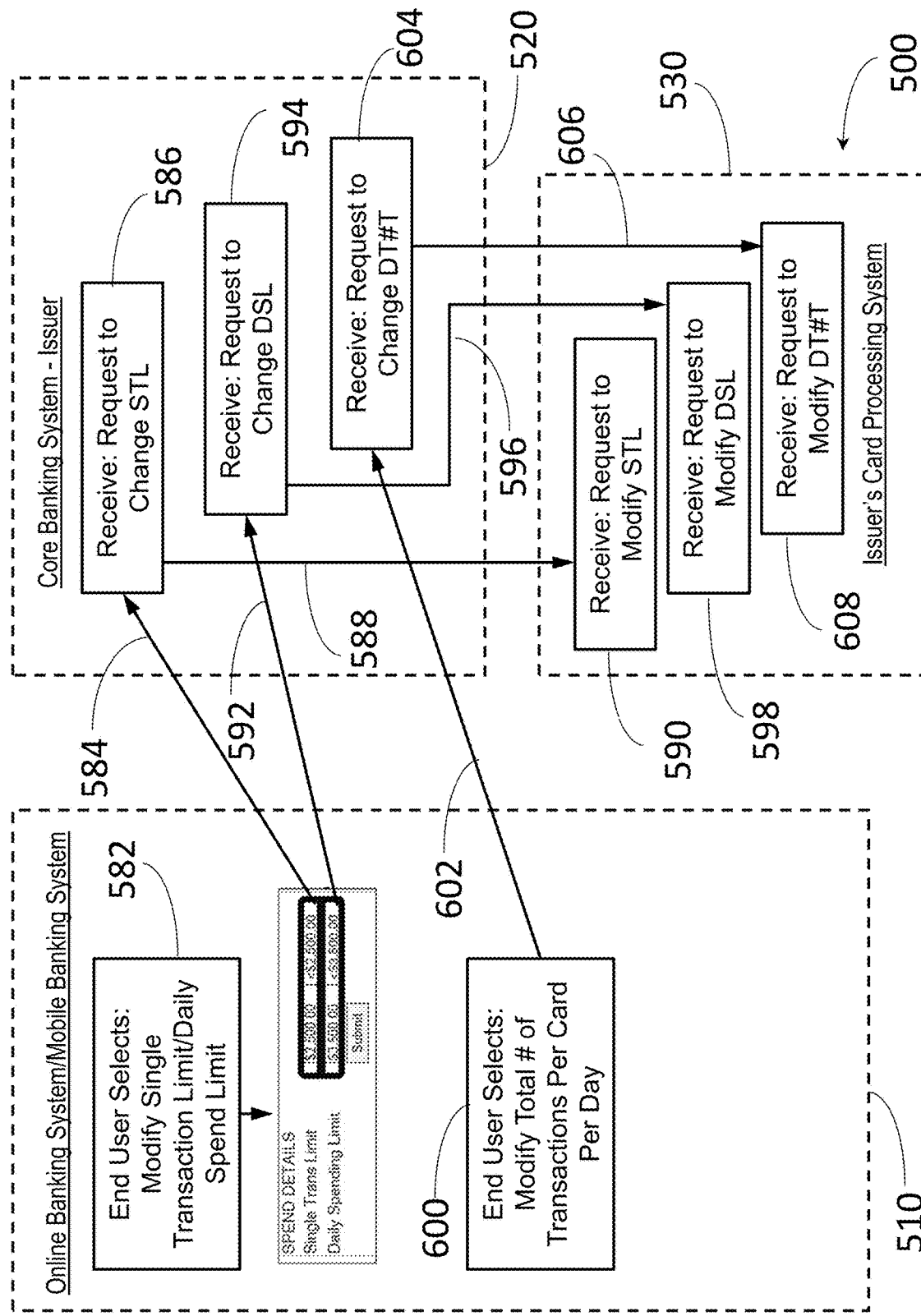

Referring now to FIG. 5D, there is illustrated an API call in the system 500 to set or select single transaction limit/daily spend limit in accordance with one embodiment. In some embodiments, the single transaction limit/daily spend limit can apply to the digital card/eCommerce card or CNP/eCommece payment card 110 only, and on other embodiments single transaction limit/daily spend limit can be set for both the physical card and the digital card/eCommerce card. The process begins at block 582 when the end user selects "Modify Single Transaction Limit/Daily Spend Limit" (e.g., FIG. 6D or FIG. 6G). When the end user modifies the Single Transaction Limit in Online Banking/Mobile Application 510, the OLB/Mobile application will send a message 584 to Core Banking System 520 to change maximum amount that can be authorized in a single signature transaction. At block 586, the Core Banking System 520 receives request 584 to change maximum authorization amount allowed for a single transaction and sends a maintenance message 588 to the Card Processor 530. At block 590, the Card Processor receives maintenance request 588 from the Core Banking System to modify single transaction limits and/or daily transaction limits for the respective digital card/eCommerce card or Physical Card.

Alternatively, at block 528, when the end user modifies the Daily Spending Limit in Online Banking/Mobile Application 510, the OLB/Mobile application will send a message 592 to Core Banking System 520 to change maximum total daily aggregate limit that can be authorized for that calendar day. At block 594, the Core Banking System 520 receives request 592 to change the maximum total daily spending aggregate limit, and sends a maintenance message 596 to the Card Processor 530. At block 598, the Card Processor 530 receives the maintenance request 596 from the Core Banking System 520 to modify maximum total daily spending aggregate limit for the respective digital card/eCommerce card or Physical Card.

Alternatively, at block 600, when the end user modifies the total number of transactions that can be authorized per card per calendar day in the OLB/Mobile application 510, the OLB/Mobile application will send a message 602 to Core Banking System 520 to change the total number of transactions that can be authorized per card per calendar day. At block 604, the Core Banking System 520 receives request 602 to change the total number of transactions that can be authorized per card per calendar day, and sends a maintenance message 606 to the Card Processor 530. At block 608, the Card Processor 530 receives the maintenance request 606 from the Core Banking System 520 to modify the total number of transactions that can be authorized per card per calendar day for the respective digital card/eCommerce card or Physical Card.

Figure 5E:
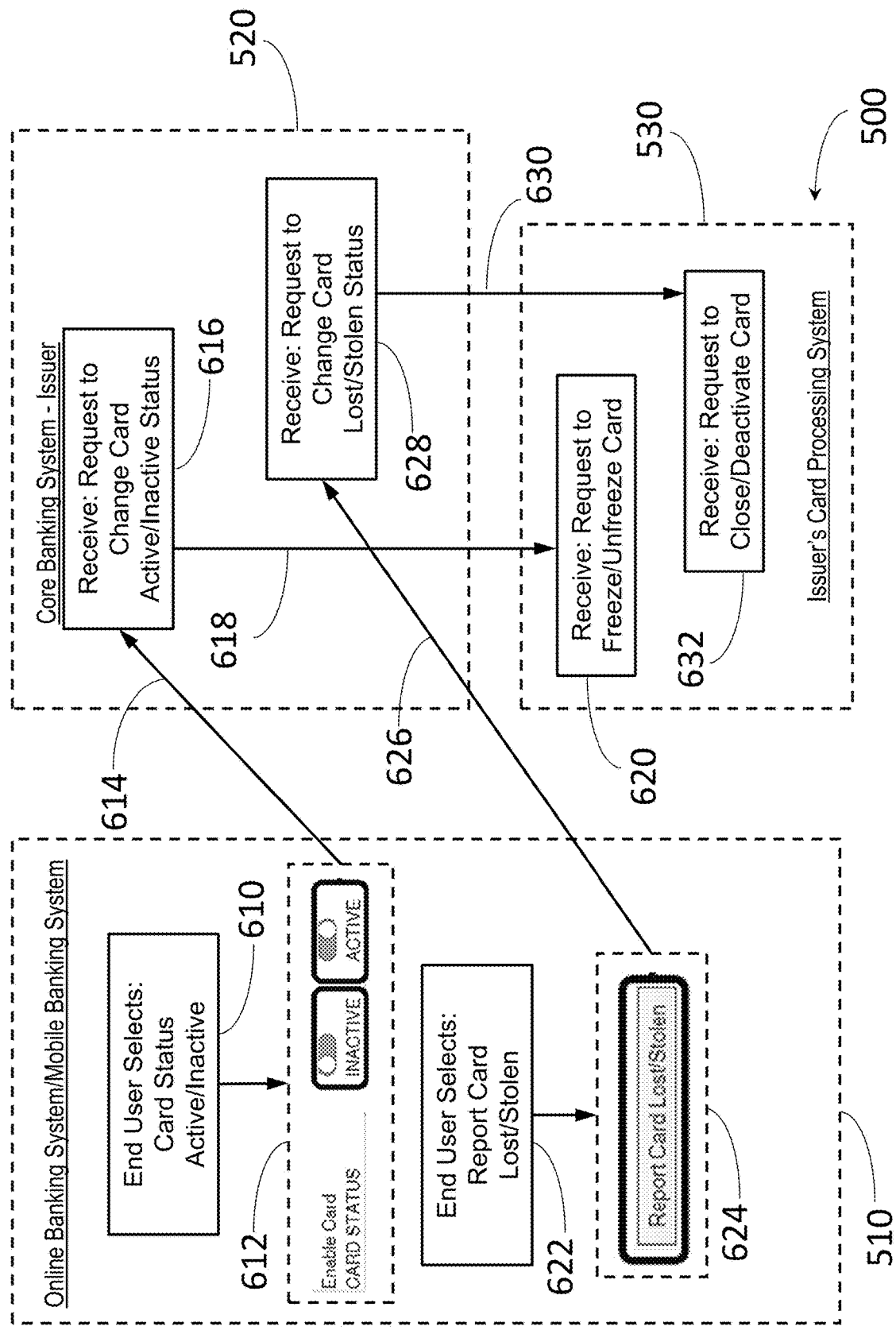

Referring now to FIG. 5E, there is illustrated an API call in the system 500 to enable the card and report lost/stolen card in accordance with one embodiment. The process can begin at block 610 when the end user selects "Enable Card" or "Card Status" on a suitable screen 612. When the end user slides the Card Status from Inactive/Active (or vice versa) in the screen 612 of the Online banking/Mobile application 510, the OLB/Mobile application will send a message 614 to the Core Banking System 520 to freeze/unfreeze the designated card (turn card on/off for authorizations). The Core Banking System 520 receives request 614 to freeze/unfreeze card and sends a maintenance message 618 to card processor 530 to turn card off/on to decline/approve authorizations. At block 620, the Card Processor 530 receives request 618 to freeze/unfreeze card from the Core Banking System 520. Alternatively, the process can begin at block 622 when the end user selects "Report Card Lost/Stolen" on a suitable screen 624. When the end user activates the "Report Card Lost/Stolen" control in screen 624 of the Online banking/Mobile application 510, the OLB/Mobile application will send a message 626 to the Core Banking System 520 to request change status of card to lost/stolen. The Core Banking System 520 receives request 626 to change status of card to lost/stolen at block 628. The block 628 sends a maintenance message 630 to card processor 530 to block the designated card and decline all authorizations for the designated card account number. At block 632, the Card Processor 530 receives request 630 to close/deactivate the designated card due to the card being reports as lost/stolen.

Figure 5F:
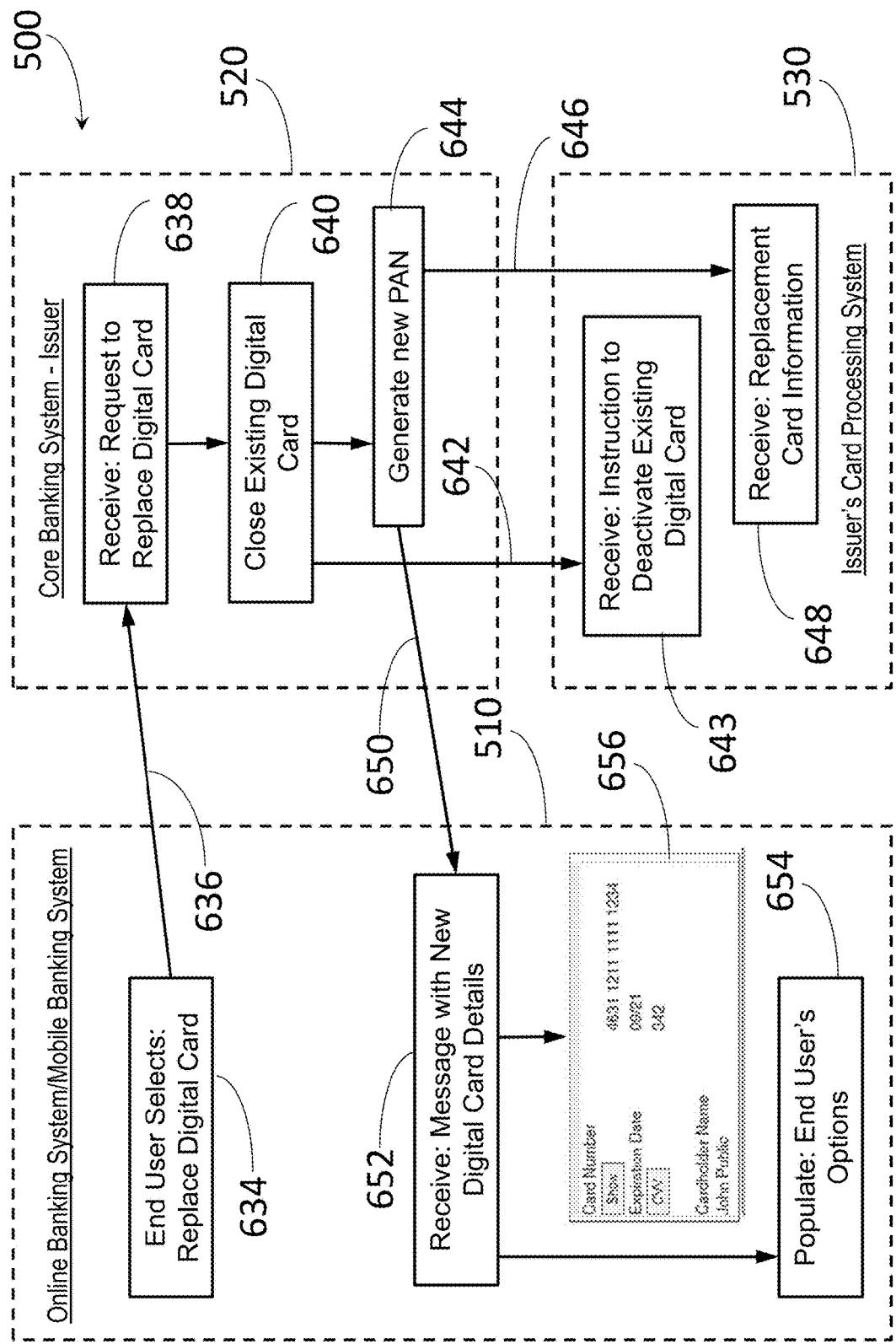

Referring now to FIG. 5F, there is illustrated an API call in the system 500 to replace Digital Card (or eCommerce Card or other designated card) in accordance with one embodiment. The process can begin at block 634 when the end user selects "Replace Digital Card" on a suitable screen (e.g., FIG. 6D or FIG. 6G). When the end user activates "Replace Digital Card" in the Online banking/Mobile application 510, the OLB/Mobile application will send a message 636 to the Core Banking System 520 to turn off the digital card/eCommerce card a generate a replacement digital card/eCommerce card number. At block 638, the Core Banking System 520 receives the request 636 to close the existing digital card/eCommerce card number and to generate a new PAN (Primary Account number). In some embodiments, the new PAN will be selected within a predetermined BIN range reserved for digital card/eCommerce card numbers. At block 640, the Core banking system 520 sends a maintenance request 642 to change card status on existing card to closed. At block 643, the Card processor 530 receives the maintenance request 642 to close/deactivate existing digital card/eCommerce card number. At block 644, the Core banking system 520 generates the replacement card PAN information/detail. From block 644, the replacement digital card/eCommerce card PAN information/detail is provided to the Card Processor 530 via message 646 like any other replacement card order request. Also from block 644, the replacement digital card/eCommerce card PAN information/detail is sent to the OLB/Mobile application 510 via message 650. At block 648, the Card Processor 530 receives replacement cardholder record in message 646 from the Core Banking System 520 that a new digital card/eCommerce card has been created. The card details are added to the card management system for activation and authorization screening like all other new card order requests. Card Processor 530 has Digital BIN range enabled to only authorize CNP transactions and decline any card present (swiped/chip processed) authorizations. At block 652, the OLB/Mobile System 510 receives message 650 from core banking system 520 with digital card/eCommerce card details to populate the end user's card management option section in OLB/Mobile. At block 654, the OLB/Mobile System 510 populates the digital details as shown in screen image 656.

Figure 5G:
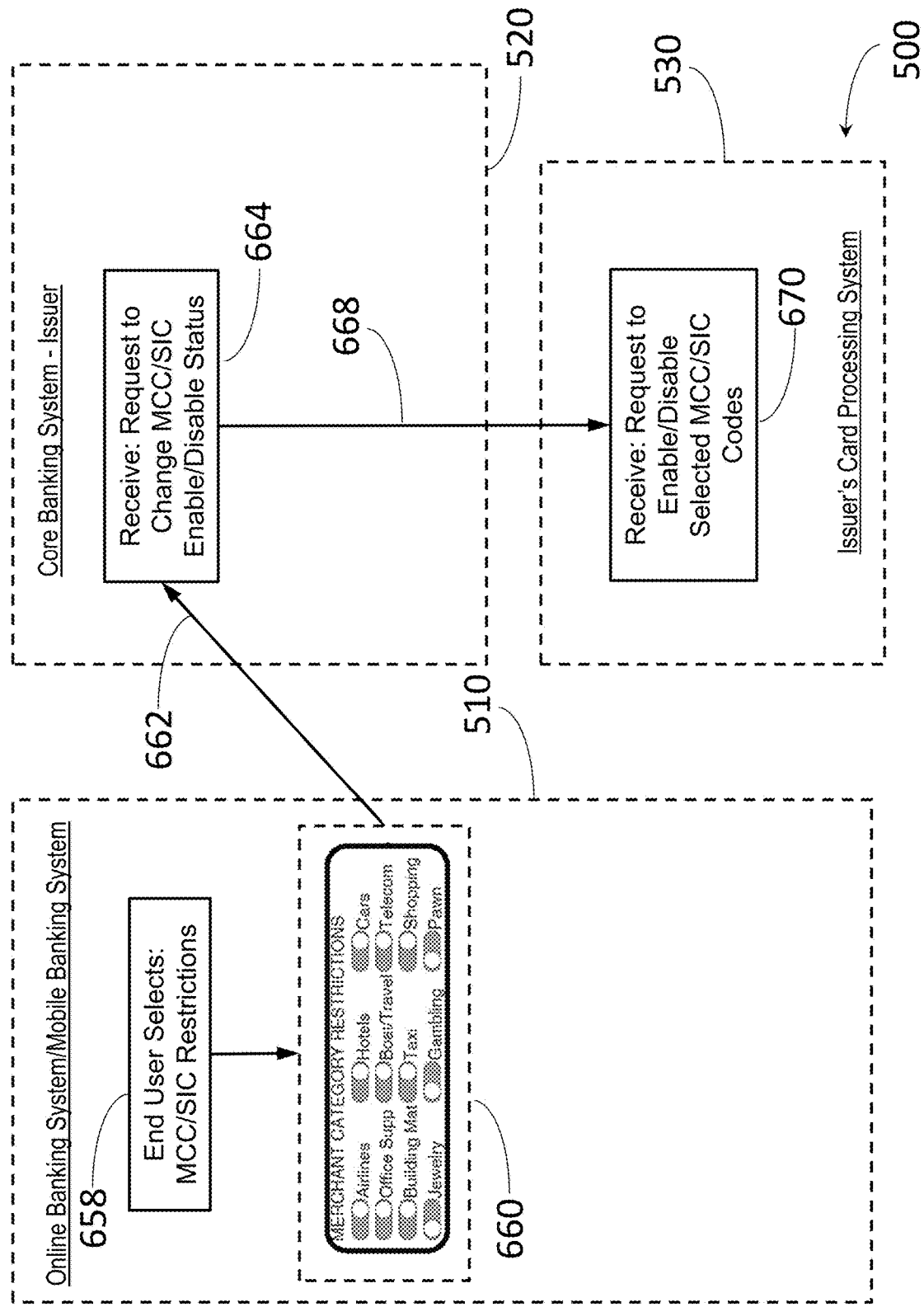

Referring now to FIG. 5G, there is illustrated an API call in the system 500 to set or select MCC/SIC restrictions for the designated card. The process can begin at block 658 when the end user chooses to enable/disable certain merchant categories in Online Banking/Mobile Application 510 using e.g., a screen interface 660 (e.g., FIG. 6G). The OLB/Mobile application 510 will send a message 662 to the Core Banking System 520 to turn on/off certain merchant category codes (MCC/SIC). At block 664, the Core Banking System 520 receives the request 662 to turn on/off certain MCC codes. The Core Banking System 520 send message 668 forwarding MCC codes enabled/disable to the Card Processor 530 to add cardholder preferences in the authorization criteria. At block 670, the Card processor 530 receives request 668 from Core Banking System 520 to enable/disable certain MCC/SIC codes for transaction authorizations.

Figure 5H:
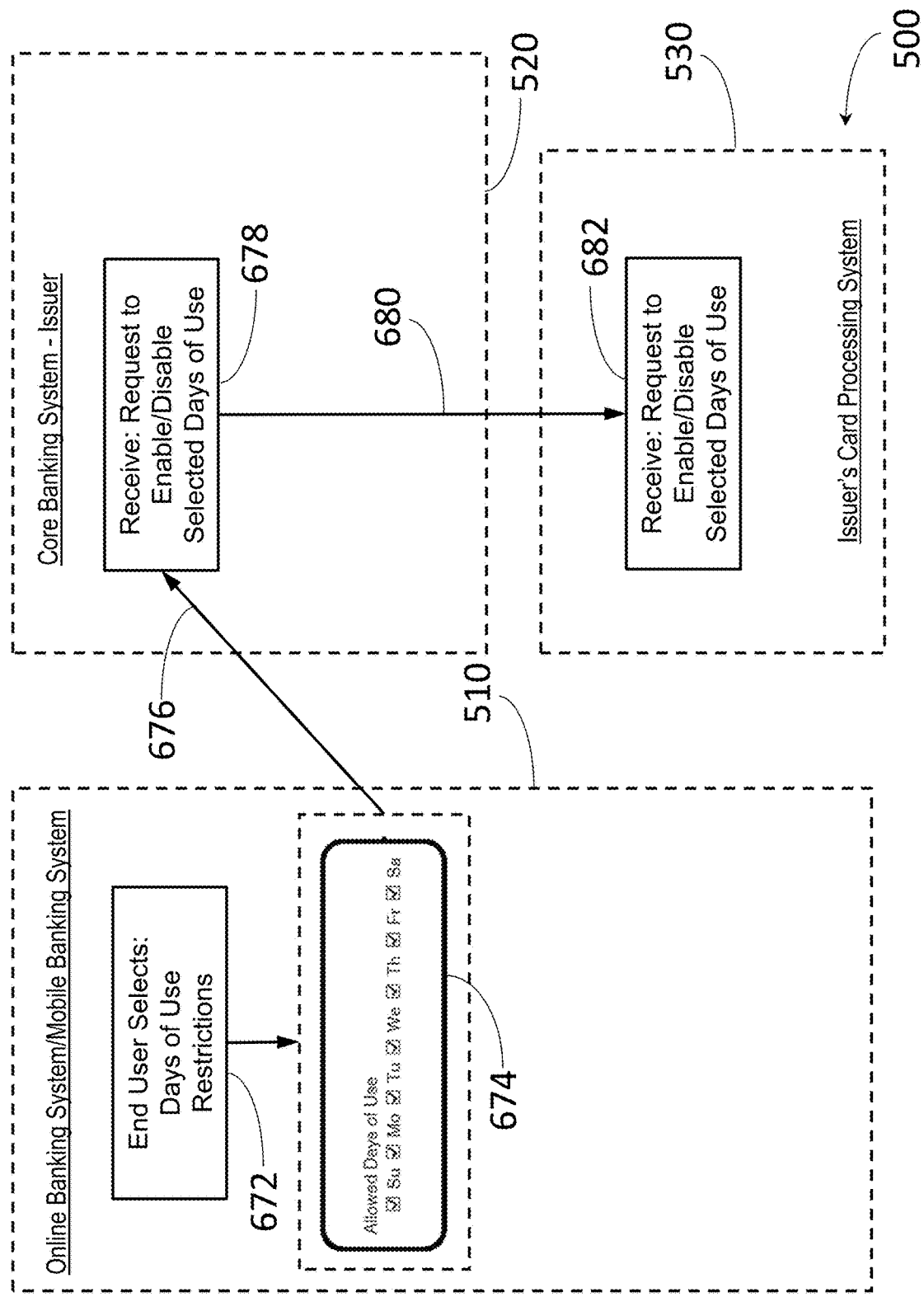

Referring now to FIG. 5H, there is illustrated an API call in the system 500 to set or select Allowed Days of Use for the designated card. The process can begin at block 672 when the end user chooses to enable/disable certain days of use for the designated card in Online Banking/Mobile Application 510 using e.g., a screen interface 674 (e.g., FIG. 6G). The OLB/Mobile application 510 will send a message 676 to the Core Banking System 520 to turn on/off transactions for those days selected. At block 678, the Core Banking System 520 receives the request 676 to turn on/off certain days of use. The Core Banking System 520 sends message 680 specifying any calendar day restrictions to the Card Processor 530 to add cardholder preferences in the authorization criteria. At block 682, the Card processor 530 receives request 680 from the Core Banking System 520 to enable/disable certain days for transaction authorizations.

Figure 6D:
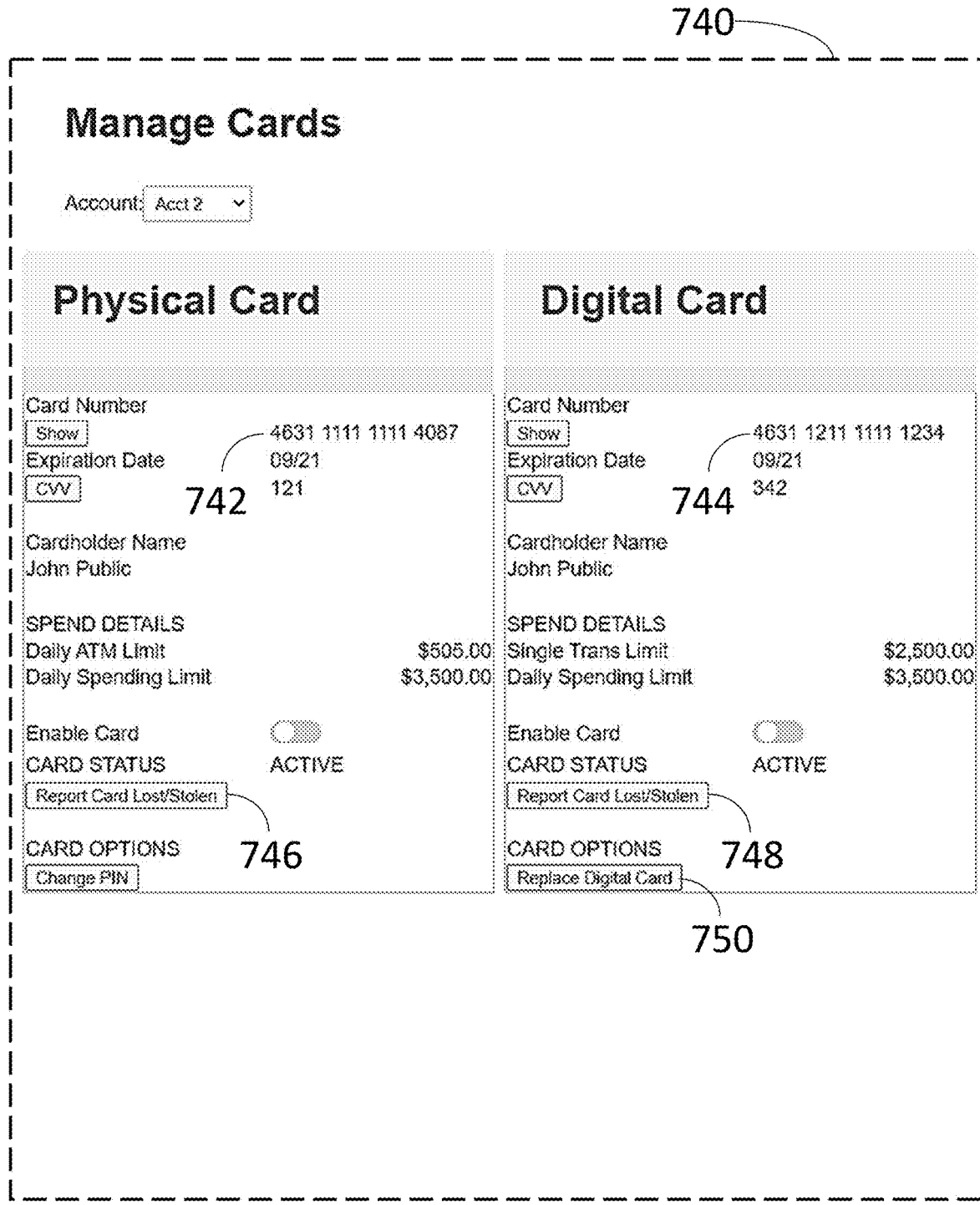

Referring now to FIGS. 6A-6G, a number of graphical user interface (GUI) screens are shown, which are suitable for implementing the payment system 500 of FIGS. 5A-5H. Referring first to FIG. 6A, there is illustrated an exemplary GUI screen 710 for use by an end-user in an Online Banking/Mobile Application 510. Screen 710 provides account information for the end-user's accounts. By clicking on any of the "Acct" links 712, the end-user can access the account details for the selected account.

Referring to FIG. 6B, there is illustrated another exemplary GUI screen 720 for use by an end-user in an Online Banking/Mobile Application 510. Screen 720 provides account details for a selected one of the end user's accounts. In the illustrated embodiment, screen 720 can be accessed by clicking link 712" in screen 710 of FIG. 6A. The account detail screen 720 can include an "Add Card" link 722 to allow the end user to create a digital card/eCommerce card (e.g., CNP/eCommece payment card 110) associated with their account. The account detail screen 720 can include a "Manage Card" link 724 to allow the end user to manage digital and physical cards associated with their accounts.

Referring to FIG. 6C, there is illustrated another exemplary GUI screen 730 for use by an end-user in an Online Banking/Mobile Application 510. Screen 730 allows the end user to create a digital card/eCommerce card for online/keyed/telephone purchases, e.g., CNP/eCommece payment card 110. In the illustrated embodiment, screen 730 can be accessed by clicking link 722 in screen 720 of FIG. 6B. The Add Card screen 730 can include a link 732 to allow the end user to add a digital card/eCommerce card (e.g., CNP/eCommece card 110) and protect their physical card (e.g., by converting it to CPO card 105). In an alternative embodiment, a similar screen could be used to create a hybrid payment card 405 including a CPO account number and a separate CNP account number as previously described.

Referring to FIG. 6D, there is illustrated another exemplary GUI screen 740 for use by an end-user in an Online Banking/Mobile Application 510. Screen 740 is a "Manage Cards" screen that displays information regarding the physical card and digital card/eCommerce card associated with a single end-user account. In the illustrated embodiment, screen 740 can be accessed, e.g., by clicking link 724 on screen 720 of FIG. 6B. The screen 740 displays various information regarding the physical (or CPO) card and the digital (or CNP) card associated with the account. In the illustrated embodiment of screen 740, it can be seen that the physical card has a first account number 742 and the digital card/eCommerce card has a second, different account number 744. Among other controls, the screen 740 includes links 746 and 748 to allow the end-user to report either card lost/stolen and a link 750 to allow the end user to replace the digital card/eCommerce card.

Referring to FIG. 6E, there is illustrated another exemplary GUI screen 751 for use by an end-user in an Online Banking/Mobile Application 510. Screen 751 is another "Account Summary" screen, similar in some ways to the screen 710 previously described. However, screen 751 reflects the end-user's account summary after creation of an enhanced-security account including a digital card/eCommerce card for CNP use to complement the physical card. By selecting the link 752, the end user can see details of the enhanced-security account.

Referring to FIG. 6F, there is illustrated another exemplary GUI screen 760 for use by an end-user in an Online Banking/Mobile Application 510. Screen 760 is another "Account Details" screen, similar in some ways to the screen 720 previously described. However, screen 760 reflects the end-user's account summary after creation of an enhanced-security account including a digital card/eCommerce card for CNP use to complement the physical card.

Figure 6G:
Figure 6G:

Referring to FIG. 6G, there is illustrated another exemplary GUI screen 770 for use by an end-user in an Online Banking/Mobile Application 510. Screen 770 is an enhanced "Manage Cards" screen that displays information regarding the physical card and digital card/eCommerce card associated with a single end-user account. Screen 770 is similar in many ways to the screen 740 previously described. However, screen 770 is enhanced to provide the end user with greater choice of limits and settings to tailor the physical card (or CPO card) and the digital card/eCommerce card (or CNP/eCommece card) as desired. In particular, the screen 770 includes GUI switches 772 for setting Merchant Category Restrictions and GUI check boxes 774 for setting Allowed Days of Use.

Although the GUI screens of FIGS. 6A-6G illustrate a system 500 configured so each user account can have a physical payment card and separate digital payment card for CNP transactions, in other embodiments the system and screens can be configure to provide similar enhanced security with a hybrid payment card, e.g., card 405, having a machine readable account number and a second, different human readable account number on the same card. Settings applicable to the physical card in the current system/screens would be transferred to the machine readable account number on the hybrid card, and settings applicable to the digital card/eCommerce card in the current system/screens would be be transferred to the human readable account number on the hybrid card.

It will be appreciated by those skilled in the art having the benefit of this disclosure that this multi-use digital financial card for networked transactions provides enhanced security for payment cards. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An enhanced-security payment card, the card comprising:
   a physical card including:
      a body,
      at least one of a magnetic strip or a smart chip encoded in machine readable language on the body of the physical card with a first personal account number (PAN) for a card processing system that is not displayed in human readable form on the body of the physical card and is valid only for card-must-be-present transactions on the card processing system, and
      a printed PAN displayed in human readable form on the body of the physical card with a second PAN for the card processing system that is not encoded in machine readable language on the body of the physical card and is valid only for card-not-present transactions on the card processing system, wherein the second PAN is different from the first PAN.

2. The enhanced-security payment card in accordance with claim 1, wherein:
   the first PAN is selected from a first preselected bank identification number (BIN)-number range; and
   the second PAN is selected from a second preselected BIN range.

3. The enhanced-security payment card in accordance with claim 1, further comprising:
   a return code comprising four digits printed in human readable form on the card body; and
   wherein the return code is identical to the last four digits of the first PAN.

4. The enhanced-security payment card in accordance with claim 1, wherein the physical card includes the magnetic strip encoded in machine readable language with the first PAN for the card processing system that is not displayed in human readable form on the body of the card and is valid only for card-must-be-present transactions on the card processing system.

5. The enhanced-security payment card in accordance with claim 1, wherein point of sale transactions and merchant terminal transactions are disabled for the printed PAN corresponding to the second PAN that is valid only for card-not-present transactions.

6. The enhanced-security payment card in accordance with claim 1, wherein online transactions are disabled for the first PAN encoded on the at least one of the magnetic strip or the smart chip in machine readable language that is valid only for card-must-be-present transactions.

7. The enhanced-security payment card in accordance with claim 1, wherein keyed transactions are disabled for the first PAN encoded on the at least one of the magnetic strip or the smart chip in machine readable language that is valid only for card-must-be-present transactions.

8. The enhanced-security payment card in accordance with claim 1, wherein over-the-phone transactions are disabled for the first PAN encoded on the at least one of the magnetic strip or the smart chip in machine readable language that is valid only for card-must-be-present transactions.

9. The enhanced-security payment card in accordance with claim 1, wherein account information corresponding to the printed PAN toggles online transactions.

10. The enhanced-security payment card in accordance with claim 1, wherein account information corresponding to the printed PAN toggles keyed transactions.

11. The enhanced-security payment card in accordance with claim 1, wherein account information corresponding to the printed PAN toggles over-the-phone transactions.

12. The enhanced-security payment card in accordance with claim 1, wherein the first PAN encoded in machine readable language on the body of the physical card and the second PAN displayed in human readable form on the body of the physical card are linked to a same user account in the card processing system.

* * * * *